W. N. RIDDLE.
WHEEL CULTIVATORS.
No. 180,271.  Patented July 25, 1876.
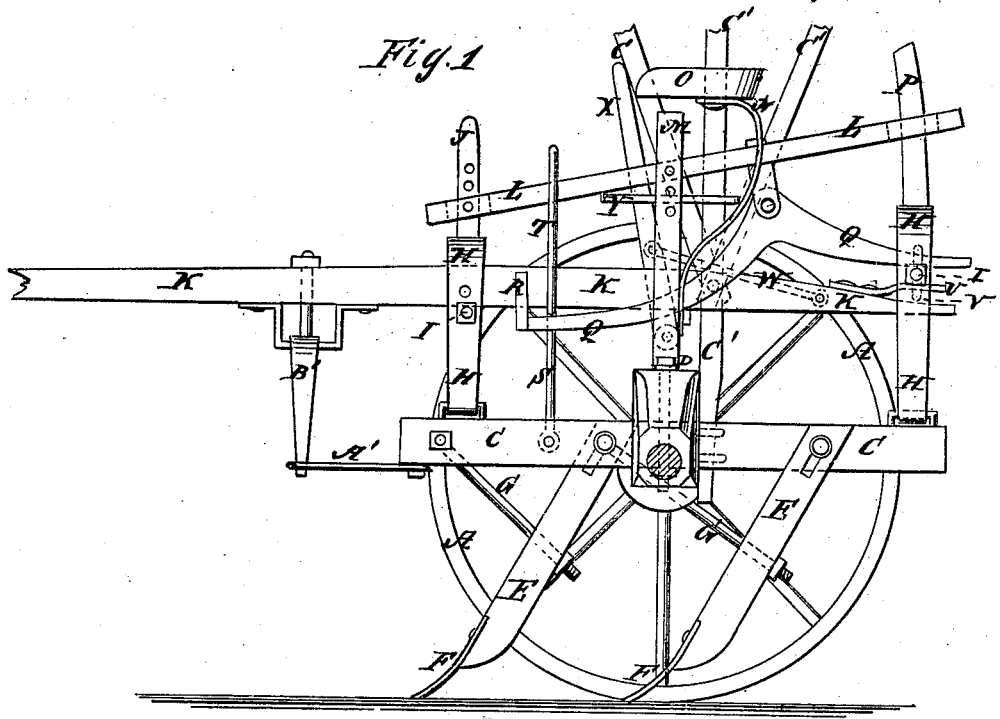
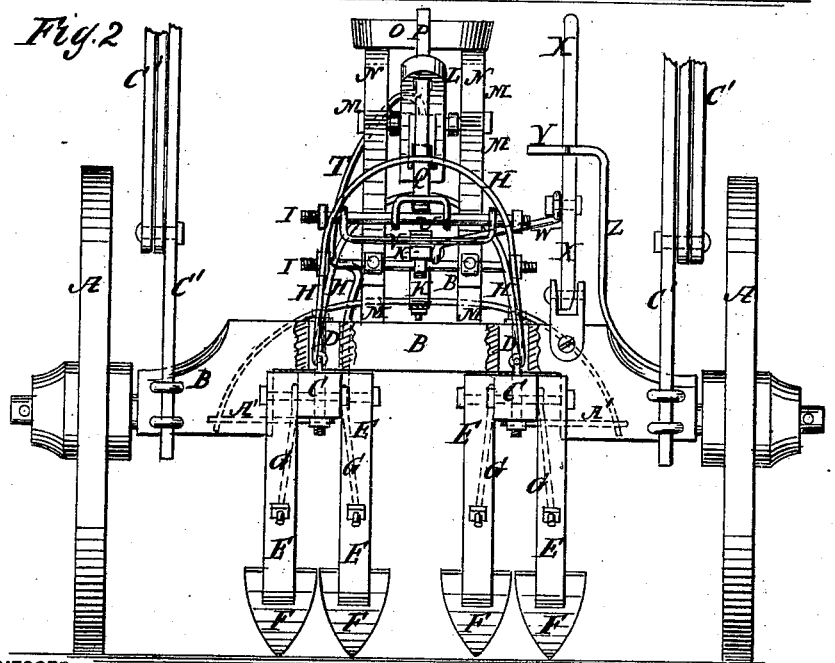
WITNESSES:
E. Wolff.
John Goethals.
INVENTOR:
W. N. Riddle
BY
ATTORNEYS.

UNITED STATES PATENT OFFICE.

WILLIAM N. RIDDLE, OF CADDO GROVE, TEXAS.

IMPROVEMENT IN WHEEL-CULTIVATORS.

Specification forming part of Letters Patent No. 180,271, dated July 25, 1876; application filed April 25, 1876.

*To all whom it may concern:*

Be it known that I, WILLIAM N. RIDDLE, of the city of Caddo Grove, county of Johnson and State of Texas, have invented a new and Improved Wheel-Cultivator, of which the following is a specification:

Figure 1 is a side view of my improved cultivator, a wheel being removed. Fig. 2 is a rear view of the same.

The object of this invention is to furnish an improved wheel-cultivator, which shall be so constructed that it may be readily adjusted for use in marking the ground, covering the seed, and cultivating the plants, and which shall be simple in construction, convenient in use, and reliable in operation in either capacity.

The invention will first be described in connection with the drawing, and then pointed out in the claims.

A are the wheels, which revolve upon the journals of the axle B. C are the plow-beams, which are placed beneath the axle B, and are kept from lateral movement by the pins or bolts D passing through them and through short slots in the axle B, so that the beams C may be adjusted wider apart or closer together, as may be required. E are the standards, to the lower ends of which are attached the plows F. The upper ends of the standards E are slotted to receive the bolts by which they are secured to the beams C, so that they may be readily adjusted to work deeper or shallower in the ground, as may be desired. The draft-strain upon the standards E is sustained by the braces G, the lower ends of which are attached to the said standards, and their upper ends are attached to the beams C. The forward and rear ends of the beams C are attached to the ends of the two bows or arched bars H. Through the upper part of the bows H are passed two horizontal pins, I. The pin I of the forward bow H passes through the lower end of the arm J, which passes up through the tongue K, through the top of the said bow H, and through the forward end of the lever L. The lever L passes back between, and is pivoted to, two uprights, M, the lower ends of which are attached to the axle B, and to which are attached the springs N that support the driver's seat O. The rear end of the lever L has a slot in its rear end to receive a guide-arm, P, the lower end of which is attached to the top of the rear bow H. Q is a bent lever, which is pivoted at its angle to the lever L, a little in the rear of the uprights M. The rear end of the lever Q is connected with the horizontal pin I that passes through the upper part of the bow H. The forward end of the lever Q has an upwardly-projecting foot-rest, R, attached to it, so that the driver can readily operate it with his foot to raise the plows from the ground. The forward end of the lever Q, when lowered, may be caught upon the catch-bar S to hold the plows away from the ground. The lower end of the catch-bar S is attached to one of the beams C. To the forward end of the lever L is attached the upper end of a guide-rod, T, to guide the forward end of the lever Q into such a position that it may be readily caught upon the catch-bar S. To the rear end of the tongue K is attached a spring, U, which rests in a loop, V, attached to the pin I to hold the plows down to their work, but which will yield to allow said plows to be raised from the ground. To the rear part of the tongue K is attached one end of a connecting-rod, W, the other end of which is attached to the lever X. The lower end of the lever X is pivoted to the axle B, and its upper part passes through the slot of a guide-bar, Y, formed upon, or attached to, the upper end of a standard, Z, the lower end of which is attached to the axle B.

By this construction, by moving the upper end of the lever X forward the plows will be moved to the right, and by moving the upper end of the said lever Y to the rearward the plows will be moved to the left, so that the plows can be easily guided in plowing crooked rows, and avoiding irregular hills.

When the plows are in their ordinary position the lever X rests in a notch in the middle part of the guide-bar Y. To the forward end of the plow-beams C are attached the rear ends of the draw-rods A', to the forward ends of which the whiffletrees are to be attached. To the tongue K is attached the center of a bar, B', the ends of which are bent downward, and are attached to the forward parts of the draw-rods A' to prevent the whiffletrees from dropping down and injuring the plants. To the end parts of the axle B are attached bows C', to receive a cover to protect the driver from the sun.

Having thus described my invention, what I claim as new, and desire to secure by Letters Patent, is—

1. The combination with pin I, having loop V, of the spring U, arranged to hold the plows down to their work, but yielding sufficiently to allow them to move, as shown and described, for the purpose specified.

2. The combination of the bows H, the pins I, the arms J P, and the lever L, with the plow-beams C, the tongue K, and the uprights M, attached to the axle B, substantially as herein shown and described.

3. The combination of the bent lever Q with the lever L, pivoted to the uprights M, and with the pin I of the rear bow H, substantially as herein shown and described.

WILLIAM NELSON RIDDLE.

Witnesses:
JOHN WESLEY DAGGETT,
PLEASANT HARPER GOODLOE.